(12) United States Patent
Amran

(10) Patent No.: US 9,000,885 B2
(45) Date of Patent: Apr. 7, 2015

(54) PORTABLE INTERFACE DEVICE FOR CONTROLLING A MACHINE

(75) Inventor: Asaf Amran, Rehovot (IL)

(73) Assignee: Hewlett-Packard Indigo B.V., Maastricht (NL)

( * ) Notice: Subject to any disclaimer, the term of this patent is extended or adjusted under 35 U.S.C. 154(b) by 242 days.

(21) Appl. No.: 13/561,906

(22) Filed: Jul. 30, 2012

(65) Prior Publication Data

US 2014/0028441 A1    Jan. 30, 2014

(51) Int. Cl.
G05B 15/00    (2006.01)
G05B 19/409    (2006.01)

(52) U.S. Cl.
CPC .... *G05B 19/409* (2013.01); *G05B 2219/36159* (2013.01); *G05B 2219/36371* (2013.01)

(58) Field of Classification Search
USPC ................. 340/3.1; 700/83; 710/73
See application file for complete search history.

(56) References Cited

U.S. PATENT DOCUMENTS

| | | | |
|---|---|---|---|
| 6,167,464 A * | 12/2000 | Kretschmann | 710/15 |
| 6,717,382 B2 * | 4/2004 | Graiger et al. | 318/587 |
| 7,320,033 B2 | 1/2008 | Bradfield et al. | |
| 7,444,188 B2 * | 10/2008 | De Meyer et al. | 700/17 |
| 2004/0260518 A1 * | 12/2004 | Polz et al. | 702/188 |
| 2005/0037709 A1 | 2/2005 | Hwang | |
| 2007/0135947 A1 * | 6/2007 | Bromley et al. | 700/83 |
| 2008/0107464 A1 | 5/2008 | Klupfel et al. | |
| 2012/0320407 A1 * | 12/2012 | Hoarau et al. | 358/1.15 |
| 2013/0024542 A1 * | 1/2013 | Keller et al. | 709/217 |

FOREIGN PATENT DOCUMENTS

GB    2275444 A    8/1994

\* cited by examiner

*Primary Examiner* — Andrew Bee

(57) ABSTRACT

Portable interface devices for controlling machines at control locations. One example device is arranged, in response to a positive verification that it is at a control location, to enable a user to control the machine by means of the device. Another example device is arranged to display information comprising control-location-specific information, based on which of at least two control locations was identified. Another example device is arranged to enable machine control for a limited period of time after a positive detection that it is located at a control location. Another example device includes a barcode reader. The device enables a user to control the machine in response to a positive verification that the barcode read is associated with the at least one control location.

9 Claims, 3 Drawing Sheets

PORTABLE INTERFACE DEVICE FOR CONTROLLING A MACHINE

BRIEF DESCRIPTION OF THE DRAWINGS

Examples will be described, by way of example only, with reference to the accompanying drawings in which corresponding reference numerals indicate corresponding parts and in which.

The drawings and the description of the drawings refer to examples of the invention and not to the invention itself.

DETAILED DESCRIPTION OF EMBODIMENTS

Figure 1:
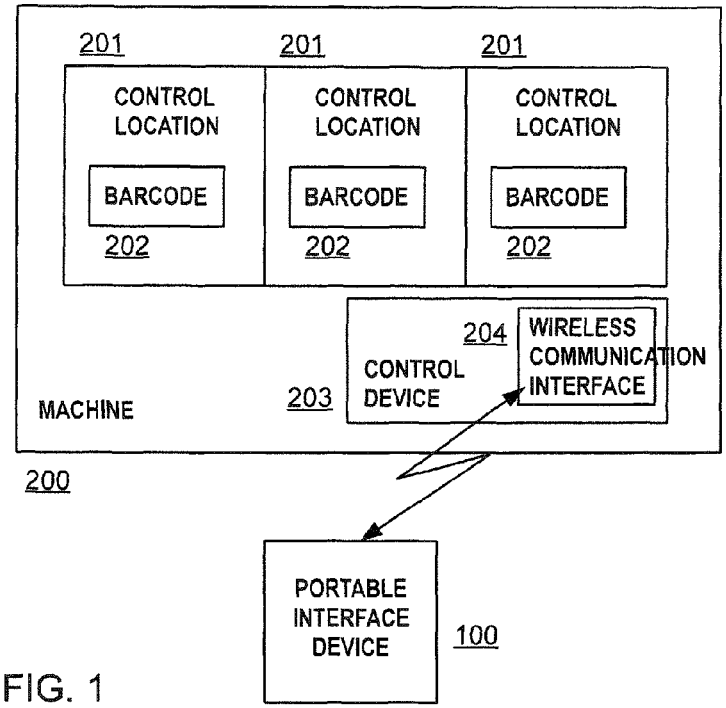
FIG. 1 is a schematic illustration of an example machine which has multiple control locations and an example portable interface device for controlling the machine.
Figure 2:
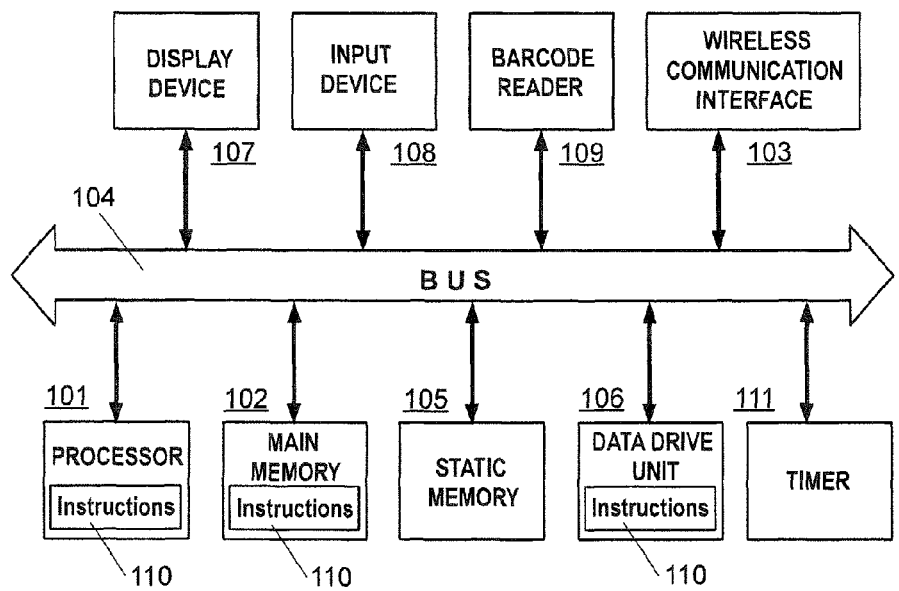
FIGS. 2 is a diagrammatic representation of the example portable interface device.

FIGS. 1 and 2 are schematic illustrations of a machine 200 and a portable interface device 100 for remotely controlling operation of the machine 200 in response to commands by a user. The example machine 200 may be a machine to handle, manufacture or modify physical goods, such as a printing press. In other examples the machine is a vehicle or an installation to transport people or goods, such as an airplane, a bus or a train, or an airport or a bus- or train station. The machine 200 may include multiple mechanical subassemblies and provides multiple (in this example three, in other examples two, four or more) control locations 201 for controlling particular functions of the machine 200. Such a control location 201 may correspond to a single subassembly or to a group of subassemblies. Furthermore, a single subassembly may be associated with multiple control locations 201. For example in the present example, where the machine 200 is a printing press, such control locations 201 correspond to subassemblies like a feeder system, an inking system or a delivery system. These control locations 201 are spatially distributed around the machine 200. In some example machines 200 such a control location 201 may be in a complex area of the machine 200, for example on the top, bottom or even inside the machine 200.

The portable interface device 100 is arranged to allow the user to remotely control the machine 200 by providing a corresponding user interface. Further, the portable interface device 100 and the machine 200 each include a wireless communication interface 103, 204 for wirelessly transmitting signals for operating the machine 200 in response to the user's input to the portable interface device 100. The machine 200 has its own control device 203, which, inter alia, directly controls the machine's 200 components in response to the signals received from the portable interface device 100. For example, the portable interface device 100 is a portable computer such as a tablet computer, notebook computer, a PDA, or a mobile phone.

FIG. 2 is a diagrammatic representation of the portable interface device 100. The portable interface device 100 is configured to execute a set of instructions so that it is able to perform the tasks described in the following. The set of instructions may include an application arranged to be executed on a portable computer as mentioned before. The portable interface device 100 includes a processor 101 and a main memory 102, which communicate with each other via a bus 104. Optionally, the portable interface device 100 may further include a static memory 105 and/or a non-transitory memory in the form of a data drive unit 106 which may be e.g. a solid state memory or a magnetic or optical disk-drive unit. The portable interface device 100 further includes a display 107 and a user input device 4, which may be realized as a touch screen display, for example. Some other examples differ in that the portable interface device 100 provides input keys for controlling the machine 200 but no display. The wireless communication interface 103 is provided to connect the portable interface device 100 to the machine 200 via an intranet or the internet.

The following description presents multiple optional features of the example portable interface device 100 and the example machine 200. Some further examples may be arranged to support only single or any combination of two or more of these features.

Figure 3:
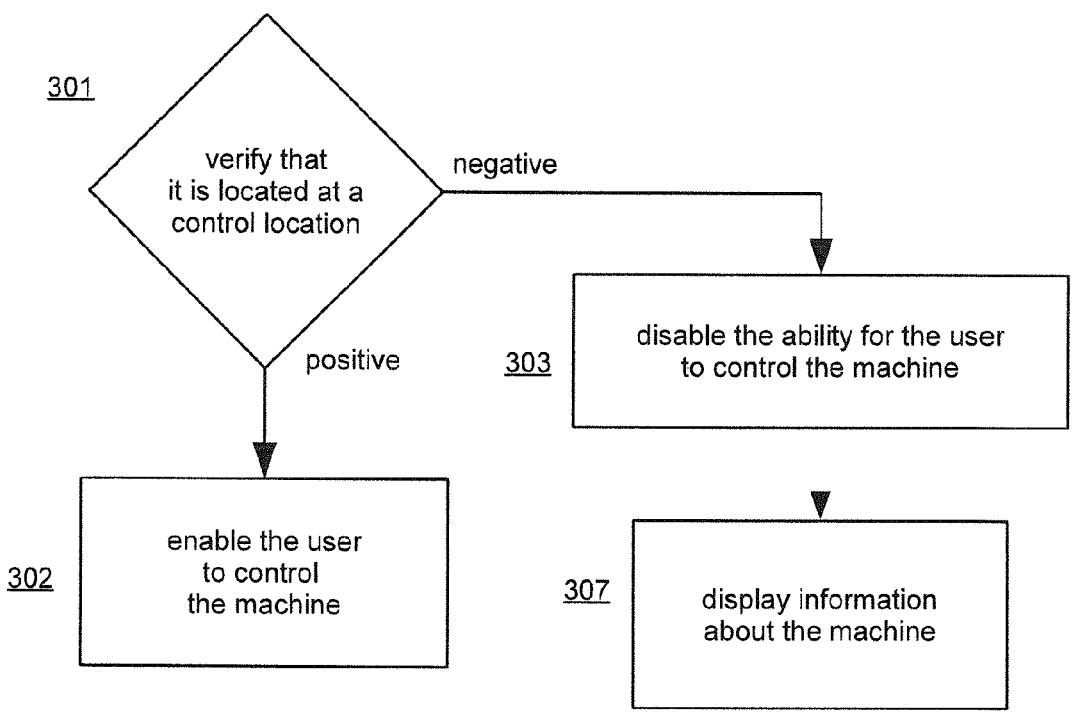
FIGS. 3 to 6 show block diagrams of example functions provided by the example portable interface device.

For example for safety reasons, some operations of the machine 200 require the user to stand physically near to a specific control location 201. As shown in FIG. 3, one optional feature of the portable interface device 100 is that it is arranged to verify at 301 that it is located at such a control location 201. In response to a positive verification, the portable interface device 100 enables at 302 the user's facility to control the machine 200. Otherwise, i.e. in the event of negative verification, the portable interface device 100 disables at 303 the user's facility to control the machine 200. Enabling and disabling the user's facility to control the machine may be performed by the portable interface device by allowing and/or blocking the facility to transmit signals to the machine 200 in response to user inputs or by (de)-activating the input device 108, for example. This feature ensures that machine 200 operations can be done only from specific physical locations, namely the control locations 201.

According to another optional feature, the portable interface device 100 is arranged to enable, at 307, information about the machine 200 to be displayed on the display device 107, even when the facility for the user to control the machine 200 is disabled. This information may include status information and/or documentation of the machine 200. In some examples where the machine is an airport, bus- or train station, this information may include information about arrival or departure or advertisement. Thus, the portable interface device 100 may display such information when it is not located at a control location 201. However, some further examples are additionally or alternatively arranged to display information about the machine 200 when it is located at a control location 201 and/or when the user's facility to control the machine 200 is enabled.

Figure 4:
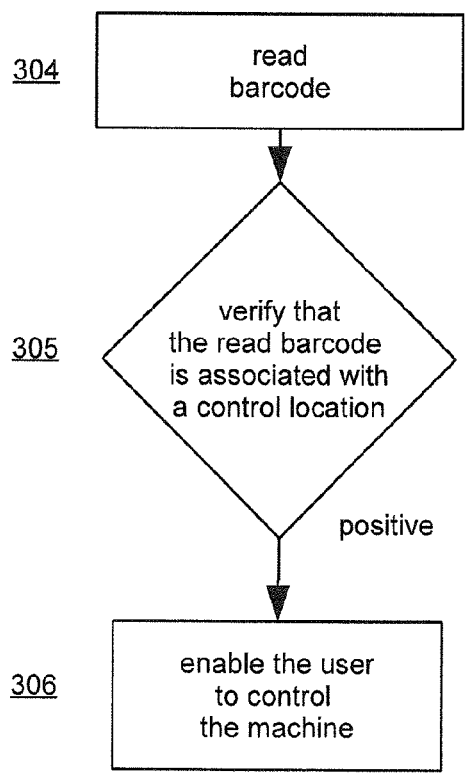

According to another optional feature, the control locations 201 of the machine 200 are equipped with identification barcodes 202 and the portable interface device 100 includes a barcode reader 109. As shown by FIG. 4, the portable interface device 100 is arranged to verify at 305 that a barcode 202 read at 304 is associated with at least one of the control locations 201. This allows the portable interface device 100 to verify that it is located at a control location 201 by reading the barcode 202. Finally, the portable interface device 100 enables at 306 the user's facility to control the machine 200 in response to a positive verification at 305.

The control locations 201 are equipped with unique identification barcodes 202 and the portable interface device 100 is arranged to thereby clearly identify each of the control locations 201. Thus, the portable interface device 100 is further arranged to identify and distinguish particular control locations 201.

Alternatively or additionally, in some other examples, a control location 201 may be equipped with multiple identical barcodes 202 distributed around the location 201, for example in the event of a large-area control location 201.

In some other examples, alternatively or additionally, two control locations 201 may be equipped with identical barcodes 202. These control locations 201 may, for example, be associated with the same functions of the machine 200 and/or they are spatially placed on different sides of the same subassembly of the machine 200—in other words, one subassembly of the machine 200 may be operated from at least two control locations 201, which then are not distinguished by the portable interface device 100.

Another optional feature regards the information transmitted via the wireless communication interfaces 103, 204 from the portable interface device 100 to the machine 200. The portable interface device 200 is arranged to transmit a signal with the operation request in response to a user input. Furthermore, the portable interface device 100 is arranged to transmit information about the identified control location 201, for example an ID represented by the identified barcode 202. This allows the machine 200 to verify that the operation request relates to itself and/or to detect the position of the user. In some examples, each operation request is transmitted together with the ID of the control location 201.

Figure 5:
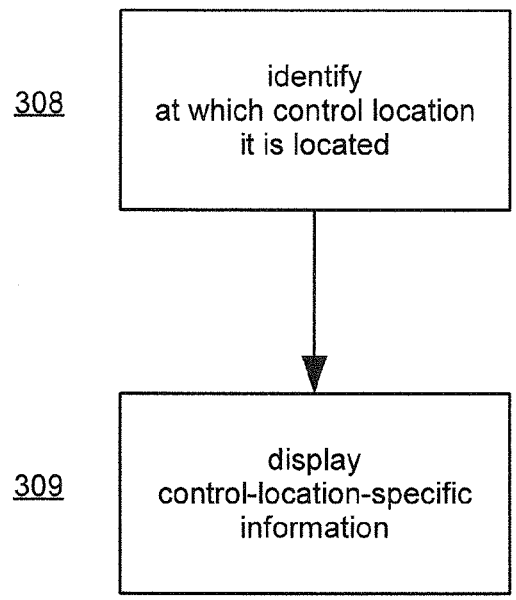

According to another optional feature, the portable interface device 100 is arranged to display information comprising control-location-specific information at 309, as shown by FIG. 5. This control-location-specific information is based/dependent on which of the control locations 201 was identified. For example, this control-location-specific information comprises information about an additional physical interface like buttons of the specific control location 201.

According to another optional feature, different control locations 201 may be associated with a set of operations that include control-location-specific control operations. For example, the control location 201 associated with the feeder system of the printing press requires (at least some) different control operations to those for the inking system of the printing press. Therefore, the portable interface device 100 is arranged to enable the corresponding set of control operations which include control operations that are specific for the identified control location 201. Furthermore, the portable interface may display a control-location-specific user interface. This makes sure that the user is only allowed to perform operations that are relevant for the respective control location 201.

Figure 6:
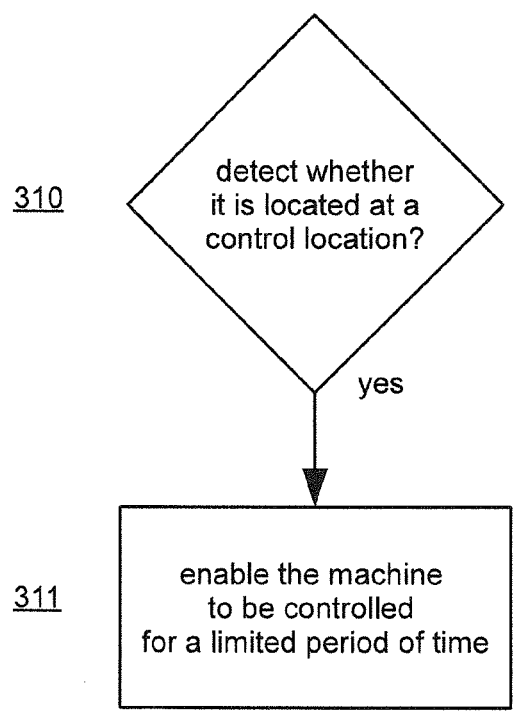

According to another optional feature shown in FIG. 6, the portable interface device 100 is arranged to enable at 311 the controlling of the machine 200 only for a certain period of time after detecting at 310 that the portable interface device 100 is located at a control location 201. As regards safety issues for example, this makes sure that the distance between the portable interface device 100, i.e. also the user, and a specific control location 201 of the machine 200 is within a given range, as the portable interface device 100 and the machine 200 are not connected by wire or otherwise mechanically. The portable interface device 100 is also equipped with a timer 111 which is started by said detection 310. This timer 111 is only started if the portable interface device 100 is at a control location 201. When the user moves away from the control location 201, the timer, if it is running, will stop after a predetermined period of time and thereby triggers the portable interface device 100 to disable the user's facility to control the machine 200. For example, this given period of time may be three, five or ten seconds.

In particular, the timer 111 is started by the reading of the barcode 202 and after verification that the barcode 202 read is associated with one of the control locations 201. In this example, the barcode reader 109 is arranged to read the barcode 202 by a scanning motion with the portable interface device 100 by the user. The user has to register at a control location 201 by scanning the control location's 201 barcode 202 in order to operate the machine 200 via the portable interface device 100. The timer starts automatically upon registration and provides the given period of time in which the user is allowed to operate the machine 200. When the time expires, the user's facility to operate the machine 200 is disabled. If the user wishes to continue operating the machine 200, he has to repeat this registration procedure. The given period of time depends on which of the control locations 201 was identified by the portable interface device 100, because different control locations 201 may require different kinds of operations.

Some other examples differ in that the portable interface device is arranged to scan for barcodes 202 periodically and automatically. This example portable interface device is able to automatically detect a barcode 202 if the barcode 202 appears in a field of view of the barcode reader 109, i.e. within a certain range of the portable interface device. If the portable interface is located at a control location 201 and if it has an unobstructed view of the control location's 201 barcode 202, the timer 111 will be re-started each time the barcode 202 is automatically scanned and verified. This allows the user to control the machine 200 continuously as long as the portable interface device remains at the control location 201 and has an unobstructed view of the barcode 202. Short interruptions of the view of the barcode 202 will be bridged by the timer, since the given period of time is chosen to be longer than the time between the automatically scans of the barcode 202. Removing the portable interface device from the control locations 201, i.e. leaving the control location 201, means that the barcode 202 definitively disappears from the field of view of the barcode reader 109 and, consequently, that the timer 111 stops after the given period of time, because it is no longer automatically re-started. As a result, the portable interface device will automatically disable the user's facility to operate the machine 200, when the user leaves the control location 201.

Some other examples differ in that the machine 200 has two main control locations where most of the machine's 200 functions can be controlled. These main control locations are equipped with permanently installed interface devices, for example a computer terminal. However, the portable interface device 100 may also be used at the main control locations providing there the same range of functions as the permanently installed interface devices.

According to another optional feature, the control locations 201 are equipped with docking stations for mechanically connecting the portable interface device 100 to them. Some other examples differ in that the portable interface device 100 is arranged to enable the user's facility to operate the machine 200 only if the portable interface device 100 is physically connected to the docking station.

Now, some more general examples are described:

As described, an example portable interface device is arranged for controlling a machine at at least one control location.

In some examples, additionally or alternatively, the portable interface device is arranged to verify that it is located at the at least one control location. The portable interface device is arranged, in response to a positive verification, to enable a user to control the machine by means of the portable interface device and, in response to a negative verification, to disable the user's facility to control the machine, but to enable information about the machine to be displayed.

In some examples, additionally or alternatively, the portable interface device is arranged to identify at which of the at least two control locations it is located and to display information including control-location-specific information, based/depending on which of the at least two control locations was identified.

In some examples, additionally or alternatively, the portable interface device is arranged to detect whether it is located at one of the control locations and to enable the machine to be controlled by means of the portable interface device for a limited period of time after a positive detection.

Additionally, the portable interface device may be arranged to control the machine at either of at least two control locations, wherein the portable interface device is further arranged to identify at which of the at least two control locations it is located. Furthermore, the limited period of time may depend on which of the at least two control locations was identified.

In some examples, additionally or alternatively, at least one control location is equipped with an identification barcode and the portable interface device includes a barcode reader. The portable interface device is arranged to verify that a barcode read is associated with the at least one control location. The portable interface device is further arranged to enable a user to control the machine by means of the portable interface device, in response to a positive verification.

Additionally, at least two control locations may be equipped with identification barcodes which are unique to the said control locations, wherein different control locations are associated with a set of control operations including control-location-specific control operations. The portable interface device may be arranged to identify a specific one of the at least two control locations by means of the unique identification barcode. The portable interface device may further be arranged to enable the set of control operations with the control operations that are specific for the identified control location.

Additionally, the portable interface device may be arranged to display a location-specific user interface based/depending on which control location it is located.

Additionally, the portable interface device may be arranged to transmit operation requests to the machine in response to user input, wherein the transmitted operation requests may include an ID of the control location the portable interface device is located at.

Additionally, the portable interface device may be arranged to display status information and/or instructional information about the machine.

Additionally, the portable interface device may be arranged to connect to the machine by wireless connection, for example via an intranet or the internet.

Although certain products and measures constructed in accordance with the teachings of the invention have been described herein, the scope of coverage of this patent is not limited thereto. On the contrary, this patent covers all embodiments of the teachings of the invention fairly falling within the scope of the attached claims either literally or under the doctrine of equivalents.

The invention claimed is:

1. A portable interface device for controlling a machine at at least two control locations,
   wherein the portable interface device is arranged to control the machine at either of the at least two control locations,
   wherein the portable interface device is arranged to detect whether the portable interface device is located at the at least two control locations,
   wherein the portable interface device is arranged to identify at which of the at least two control locations the portable interface device is located,
   wherein the portable interface device is arranged to enable the machine to be controlled via the portable interface device for a limited period of time after a positive detection,
   wherein the limited period of time depends on which of the at least two control locations was identified,
   wherein the portable interface device is arranged to verify that the portable interface device is located at the either of the at least two control locations,
   wherein the portable interface device is arranged, in response to a positive verification, to enable a user to control the machine via the portable interface device, thereby providing a facility for the user to control the machine via the portable interface device, and
   wherein the portable interface device is arranged, in response to a negative verification, to disable the facility for the user to control the machine, but to enable information about the machine to be displayed.

2. A portable interface device for controlling a machine at either of at least two control locations,
   wherein the portable interface device is arranged to detect whether the portable interface device is located at the at least two control locations,
   wherein the portable interface device is arranged to identify at which of the at least two control locations the portable interface device is located,
   wherein the portable interface device is arranged to enable the machine to be controlled via the portable interface device for a limited period of time after a positive detection;
   wherein the limited period of time depends on which of the at least two control locations was identified,
   wherein the portable interface device is arranged to display information comprising control-location-specific information, based on which of the at least two control locations was identified,
   wherein the portable interface device is arranged to verify that the portable interface device is located at either of the at least two control locations,
   wherein the portable interface device is arranged, in response to a positive verification, to enable a user to control the machine via the portable interface device, thereby providing a facility for the user to control the machine via the portable interface device, and
   wherein the portable interface device is arranged, in response to a negative verification, to disable the facility for the user to control the machine, but to enable information about the machine to be displayed.

3. A portable interface device for controlling a machine at at least two control locations,
   wherein the portable interface device is arranged to control the machine at either of the at least two control locations,
   wherein the portable interface device is arranged to detect whether the portable interface device is located at the at least two control locations,
   wherein the portable interface device is arranged to identify at which of the at least two control locations the portable interface device is located,
   wherein the portable interface device is arranged to enable the machine to be controlled via the portable interface device for a limited period of time after a positive detection;
   wherein the limited period of time depends on which of the at least two control locations was identified, and wherein the portable interface device is arranged, in response to a negative detection, to disable the machine to be controlled via the portable interface device, but to enable information about the machine to be displayed.

4. A portable interface device according to claim 3, wherein the portable interface device is arranged to display information comprising control-location-specific information, based on which of the at least two control locations was identified.

5. A portable interface device according to claim 3, wherein the portable interface device is arranged to further verify that the portable interface device is located at the at least two control locations,
wherein the portable interface device is arranged, in response to a positive verification, to enable a user to control the machine via the portable interface device, and
wherein the portable interface device is arranged, in response to a negative verification, to disable the facility for the user to control the machine, but to enable information about the machine to be displayed.

6. A portable interface device according to claim 3, wherein the portable interface device is arranged to further verify that the portable interface device is located at the at least two control locations,
wherein the portable interface device is arranged, in response to a positive verification, to enable a user to control the machine via the portable interface device,
wherein the portable interface device is arranged, in response to a negative verification, to disable the facility for the user to control the machine, but to enable information about the machine to be displayed, and
wherein the portable interface device is arranged to display information comprising control-location-specific information, based on which of the at least two control locations was identified.

7. A portable interface device for controlling a machine at at least two control locations equipped with a unique identification,
wherein the portable interface device comprises a barcode reader,
wherein the portable interface device is arranged to control the machine at either of the at least two control locations,
wherein the portable interface device is arranged to detect whether the portable interface device is located at the at least two control locations,
wherein the portable interface device is arranged to identify at which of the at least two control locations the portable interface device is located,
wherein the portable interface device is arranged to enable the machine to be controlled via the portable interface device for a limited period of time after a positive detection; and
wherein the limited period of time depends on which of the at least two control locations was identified, and
wherein the portable interface device is arranged to verify that the barcode reader is associated with either of the at least two control locations,
wherein the portable interface device is arranged to enable a facility for a user to control the machine via the portable interface device, in response to a positive verification, and
wherein the portable interface device, in response to a negative verification, is arranged to disable the facility for the user to control machine but to enable information about the machine to be displayed.

8. A portable interface device according to claim 7, wherein different control locations are associated with a set of control operations comprising control-location-specific control operations,
wherein the portable interface device is arranged to identify a specific one of the at least two control locations via the unique identification barcode, and
wherein the portable interface device is arranged to enable the set of control operations with control operations that are specific for the identified control location.

9. A portable interface device according to claim 7, wherein the portable interface device is arranged to display information comprising control-location-specific information, based on which of the at least two control locations was identified.

* * * * *